Oct. 6, 1925.

S. F. BASHARA 1,555,935

SHOCK ABSORBING DEVICE FOR MOTOR VEHICLES

Filed June 11, 1923   2 Sheets-Sheet 1

Inventor
Samuel F. Bashara
Jesse R. Stone
Attorney

Oct. 6, 1925.

S. F. BASHARA 1,555,935

SHOCK ABSORBING DEVICE FOR MOTOR VEHICLES

Filed June 11, 1923   2 Sheets-Sheet 2

Inventor
Samuel F. Bashara
By Jesse R. Stone
Attorney

Patented Oct. 6, 1925.

1,555,935

UNITED STATES PATENT OFFICE.

SAMUEL F. BASHARA, OF HOUSTON, TEXAS.

SHOCK-ABSORBING DEVICE FOR MOTOR VEHICLES.

Application filed June 11, 1923. Serial No. 644,622.

*To all whom it may concern:*

Be it known that I, SAMUEL F. BASHARA, a citizen of the United States, residing at Houston, Harris County, Texas, have invented a certain new and useful Improvement in Shock-Absorbing Devices for Motor Vehicles, of which the following is a full, clear, and exact description, such as will enable others skilled in the art to which it appertains to make and use the same.

My invention relates to a shock absorbing attachment to be used on motor vehicles.

It has for its object the forming of a reinforcing means to be applied to the fore part of a Ford car or the like, which attachment may be so constructed as to take the shock and vibration of traffic off the engine and the body of the car.

A particular object is to provide an efficient attachment for the shock absorbing device at the rear end of said device and to adapt it for application to the form of car now in use.

Another object is to take the shock and vibration of traffic usually received in the operation of a Ford car entirely from the crank case of the car so as not to injure the engine. It is desired to brace the attachment of the forward end of the car to the axle without transmitting the vibration of the wheels and axle to the engine but to transmit it to the frame of the car and prevent undue strain on the car engine and body.

This invention is an improvement on the shock absorber described in a co-pending application of F. E. Harpst, Serial No. 627,234, filed March 20th, 1923.

Figure 2:
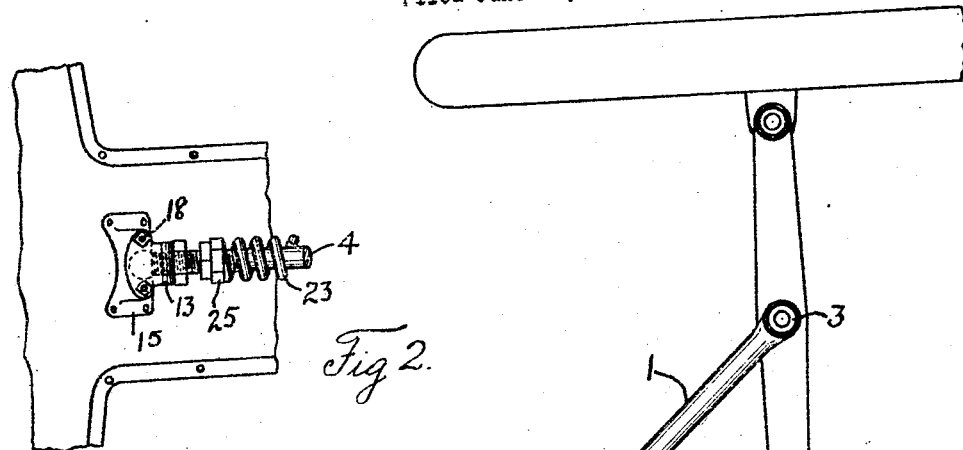
Figure 1:
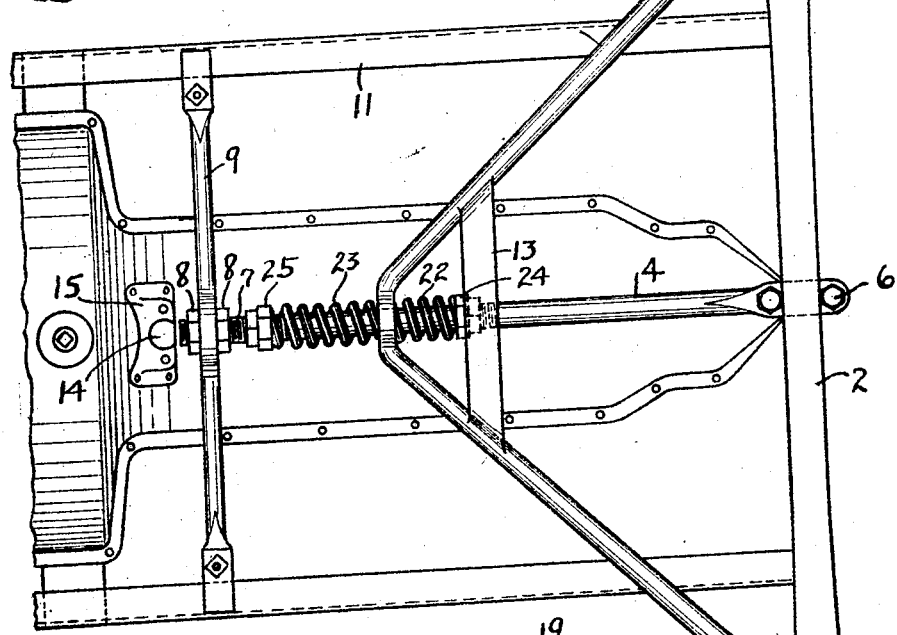
Figure 3:
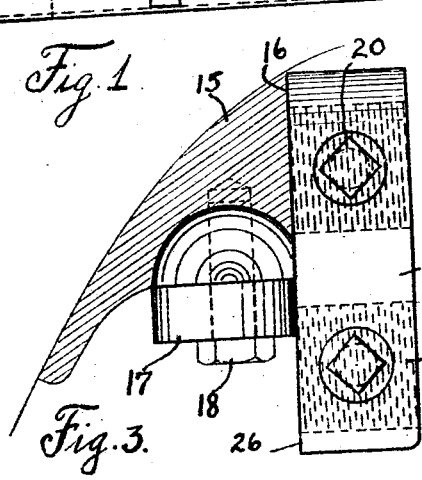
Figure 4:
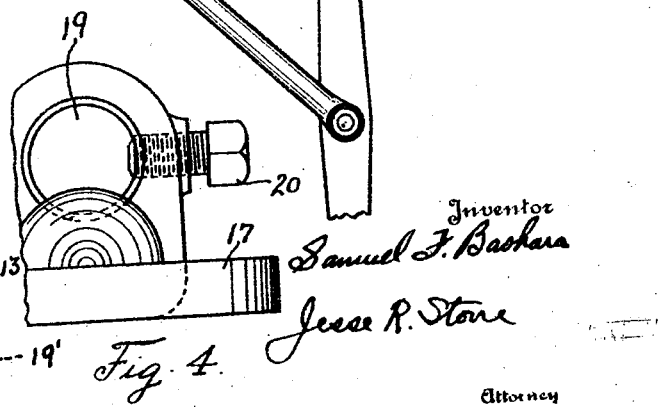
Figure 5:
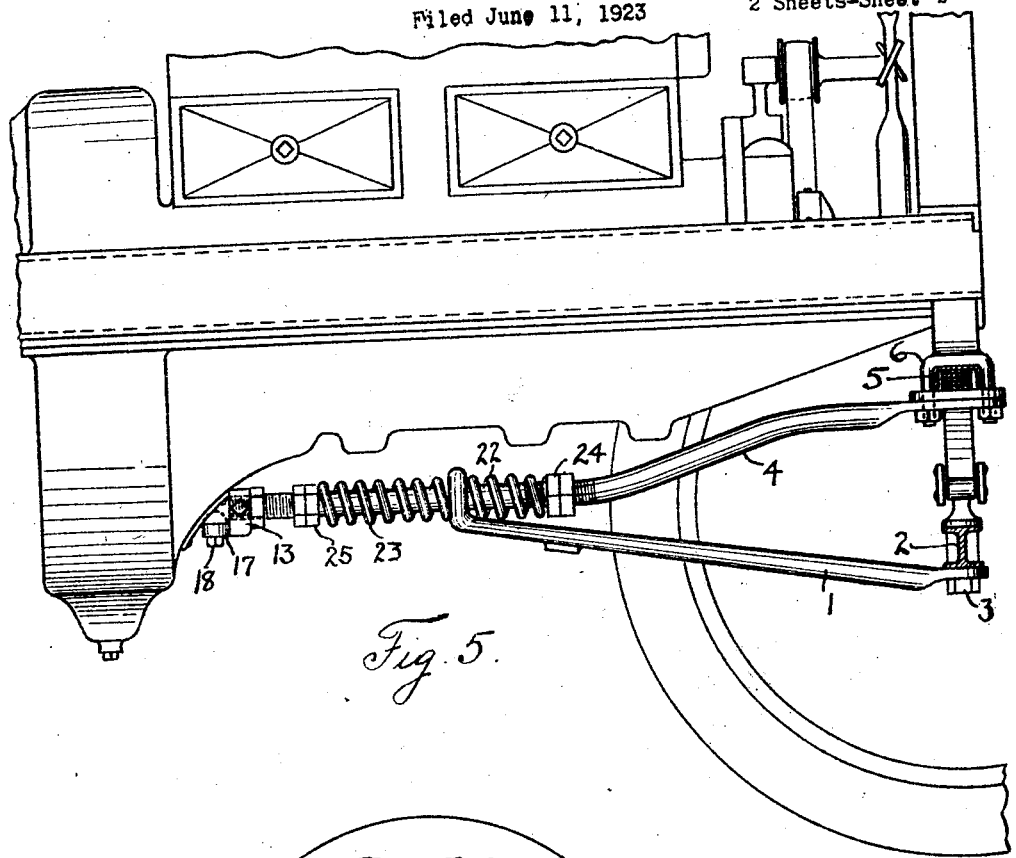
Figure 6:
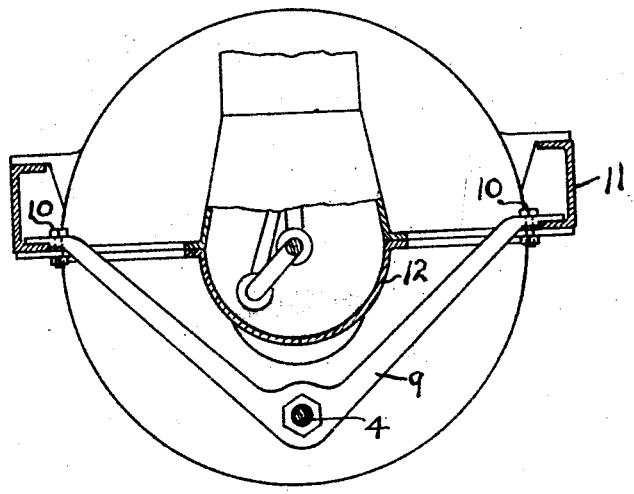

Referring to the drawing herewith, wherein like numerals of reference are applied to like parts in all the views, Fig. 1 is a bottom plan view of the forward end of a Ford car illustrating my invention; Fig. 2 is a broken detail of a modified attachment for the tie rod arm; Figs. 3 and 4 are side and broken rear elevations respectively of the the securing bracket; Fig. 5 is a side elevation showing the axle and spring in section, and Fig. 6 is a broken view illustrating the attaching bar shown in Fig. 1.

The shock absorbing attachment constituting the subject of the above mentioned application of Harpst comprises a modified form of radius rod 1, made of a bracing rod bent into V-shape and having the forward ends secured to the lower face of the axle 2 by bolts 3. A brace 13 serves to reinforce said radius rod adjacent the apex.

The apex of the rod is perforated to form a bearing to slidably receive a supporting tie rod 4 which is secured at its forward end centrally of the frame of the car at 5 by means of a shackle or clevis 6. It is curved downwardly from said frame and has its rear end threaded at 7 to receive clamping nuts 8, 8 by means of which it is secured rigidly within an opening centrally of a supporting bar 9.

Secured upon the tie rod 4 on the forward and rear sides respectively of the bearing portion of the radius rods are springs 22 and 23. These springs bear at their adjacent ends against the apex of the radius rod and at their outer ends against adjustable clamping nuts 24 and 25.

Said bar 9 is slightly V-shaped with each end extending horizontally and perforated to form an attachment by means of bolts 10, 10 to the side members 11 of the frame. The bar 9 is curved downwardly intermediate its ends to pass beneath the crank case 12 of the engine, as shown in Fig. 6.

In the embodiment disclosed in Figs. 2 to 5 inclusive, the construction is identical with that just described, except that the supporting cross bar 9 is omitted and the rear threaded end 7 of the tie rod 4 is secured within a special bracket 13. In the ordinary radius rod employed on a Ford car the apex of the rod is formed into a ball which is secured within a hemispherical recess 14 in a bracket 15 secured on the lower face of the crank case 12. In my improvement, I form the bracket 13 with a rear shoulder 16 fitting against the forward face of the bracket 15 and a rearwardly extending plate 17 having a central upper hemispherical ball to fit within said recess 14. Set screws 18, 18 on each side secure the bracket 13 rigidly to the bracket 15. The upright portion of the bracket 13 is formed with a threaded socket 19 to receive the tie rod at 7, and said rod is fixed in adjusted position therein by a set screw 20. The forward end of the bracket 13 may also be extended downwardly, as shown at 26 in Fig. 3, and provided with a second socket 19' for attachment of the rod 4 at a lower point, when desired.

In the use of the shock absorber shown, the shock and vibration of traffic will vary the distance between the spring 5 and the axle 2, thus causing the radius rod to slide upon the tie rod 4 against the cushioning action of the springs 22, 23. The shock will be delivered longitudinally of the tie rod against the attachment to the supporting bar 9 in the first embodiment. The force of the shock will be deadened by the cushioning action of the springs 22, 23 and will not be marked in its effect upon the bar 9. Said bar 9 will serve to brace the frame 11 and also take the shock of the traffic from the engine, thus serving two important purposes.

In the use of the second attaching means for the tie rod, the cushioned shock will be delivered to the crank case of the engine, but the form of bracket used will be rigid or firm not tending to wear or break. The bracket 13 has three firm bearings on the bracket plate 15; one at the forward face 16 of said plate one in the hemispherical seat 14, and there is also the further clamping of the plate 17 to the bracket plate 15 by means of the screws 18.

Both forms of attachment are advantageous as compared with previous known forms, the first in that it removes vibration due to the rough road from the crank case and the engine, and also because of its strengthening or bracing effect on the frame of the car. The second form of attachment to the bracket now employed on stock cars is particularly firm and rigid so that there is no chance for play and no danger of shearing off the attaching bolts or screws thus avoiding accidents and the necessity of repairs.

The further objects and advantages of my construction will be obvious to one skilled in the art without further description.

What I claim as new and desire to protect by Letters Patent is:

1. In a device of the character described, the combination of a Ford car frame, a front radius rod having a bearing opening at its apex, a tie rod secured to the forward end of said car frame said radius rod being slidable yieldably on said tie rod opening, and a support for the rear end of said tie rod comprising a bracket on said tie rod and an attaching means on the crank case of said car cooperating with said bracket for the purpose described.

2. In motor car, a car frame, a front axle, a radius rod connected with said axle, a tie rod having resilient connection with said radius rod, and a support for the rear end of said tie rod comprising a bracket on said rod and a bracket on the crank case of said car, interfitting parts on said brackets and clamping screws adapted to hold said brackets rigidly together.

3. In a device of the character described, in combination with the frame of a car, and a front axle, a radius rod, a tie rod secured centrally of the frame above the axle and resiliently supporting the rear end of said radius rod, a support for the rear end of said tie rod comprising, a bracket on the crank case of said car having a hemispherical recess therein and a flat forward face, and a bracket on said tie rod fitting against the flat forward face of said first mentioned bracket and having a hemispherical projection fitting in said recess and means to secure said brackets rigidly together.

4. In a motor vehicle, the combination with the car frame, a crank case having a supporting bracket thereon, and a front axle, of a radius rod secured to said axle, a tie rod secured to the forward end of said car frame, a resilient connection between said radius rod and said tie rod, a bracket on the rear end of said tie rod, and means to secure said brackets together.

In testimony whereof, I hereunto affix my signature this the 5th day of June, A. D. 1923.

SAMUEL F. BASHARA.